(12) United States Patent
Mori

(10) Patent No.: US 10,730,370 B2
(45) Date of Patent: Aug. 4, 2020

(54) VEHICLE DOOR STRUCTURE

(71) Applicant: TOYOTA JIDOSHA KABUSHIKI KAISHA, Toyota-shi (JP)

(72) Inventor: Tatsunori Mori, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/207,250

(22) Filed: Dec. 3, 2018

(65) Prior Publication Data
US 2019/0193532 A1    Jun. 27, 2019

(30) Foreign Application Priority Data

Dec. 22, 2017 (JP) ................. 2017-246713

(51) Int. Cl.
*B60J 5/00*    (2006.01)
*B60J 5/04*    (2006.01)

(52) U.S. Cl.
CPC ........... *B60J 5/0431* (2013.01); *B60J 5/0415* (2013.01); *B60J 5/0437* (2013.01); *B60J 5/0443* (2013.01)

(58) Field of Classification Search
CPC ....... B60J 5/0431; B60J 5/0443; B60J 5/0437
USPC .......................................... 296/146.5, 146.6
See application file for complete search history.

(56) References Cited

U.S. PATENT DOCUMENTS

| | | | | |
|---|---|---|---|---|
| 3,718,364 A | * | 2/1973 | Fischer | B60R 19/02 296/187.09 |
| 4,850,636 A | * | 7/1989 | McLaren | B60J 5/0437 296/146.5 |
| 5,470,125 A | * | 11/1995 | Yamazaki | B60J 5/0431 296/146.6 |
| 5,599,057 A | * | 2/1997 | Hirahara | B60J 5/0437 296/146.6 |
| 6,575,525 B2 | * | 6/2003 | Traister | B60J 5/0426 296/146.6 |
| 6,942,281 B2 | * | 9/2005 | Omori | B60J 5/0431 296/146.6 |
| 6,957,844 B2 | * | 10/2005 | Chu | B60J 5/0437 296/146.6 |
| 6,969,107 B2 | * | 11/2005 | Omori | B60J 5/0411 296/146.6 |
| 10,435,088 B2 | * | 10/2019 | Smith | B62D 33/0273 |
| 2014/0191535 A1 | * | 7/2014 | Sugiyama | B62D 25/16 296/193.05 |

(Continued)

FOREIGN PATENT DOCUMENTS

| | | | | |
|---|---|---|---|---|
| FR | 2291885 A1 | * | 6/1976 | ............. E05D 11/00 |
| JP | 2008-120221 | | 5/2008 | |
| JP | 2010-149841 | | 7/2010 | |

*Primary Examiner* — Dennis H Pedder
(74) *Attorney, Agent, or Firm* — Oblon, McClelland, Maier & Neustadt, L.L.P.

(57) ABSTRACT

A vehicle door structure includes: a door hinge member mounted on a vehicle body; a door inner panel that constitutes a side door of an automobile; a door outer panel that is mounted on an outer side of the door inner panel in a vehicle width direction, and constitutes the side door of the automobile; and a door impact beam that is disposed between the door inner panel and the door outer panel, a first end side of the door impact beam being mounted on the door inner panel through a mounting member, a second end side of the door impact beam being rotatably mounted on the door hinge member.

4 Claims, 8 Drawing Sheets

(56) References Cited

U.S. PATENT DOCUMENTS

2014/0375078 A1* 12/2014 Fujihara ................ B60J 5/0443
                                                                296/146.6

* cited by examiner

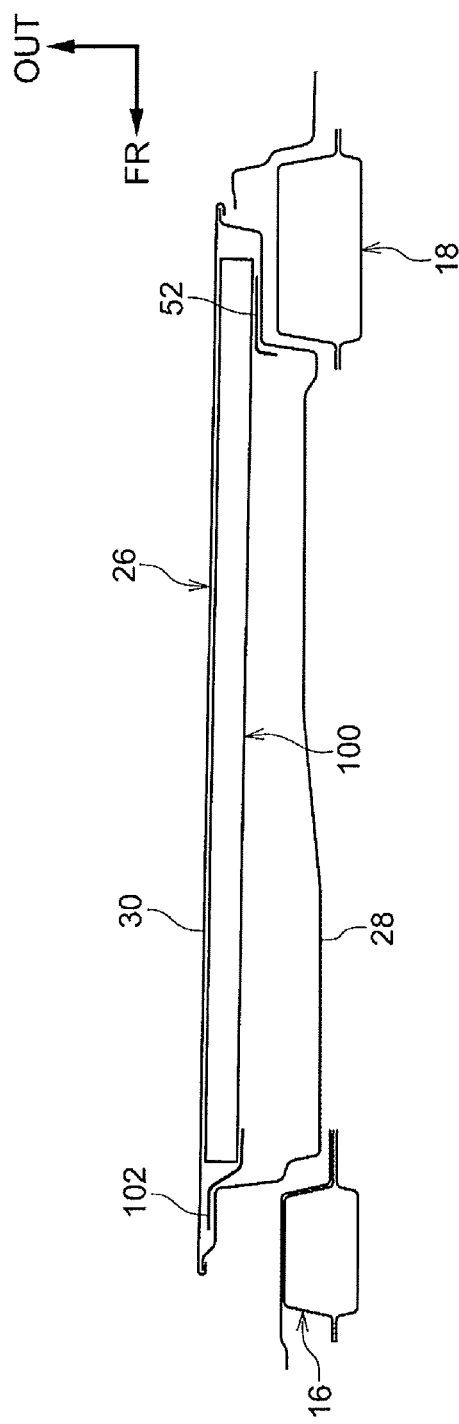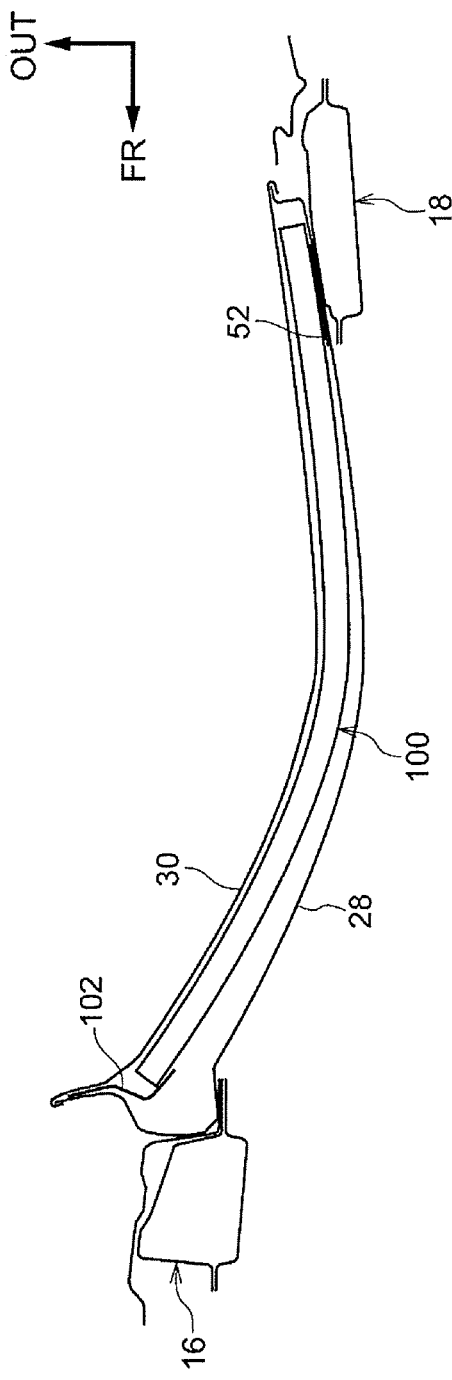

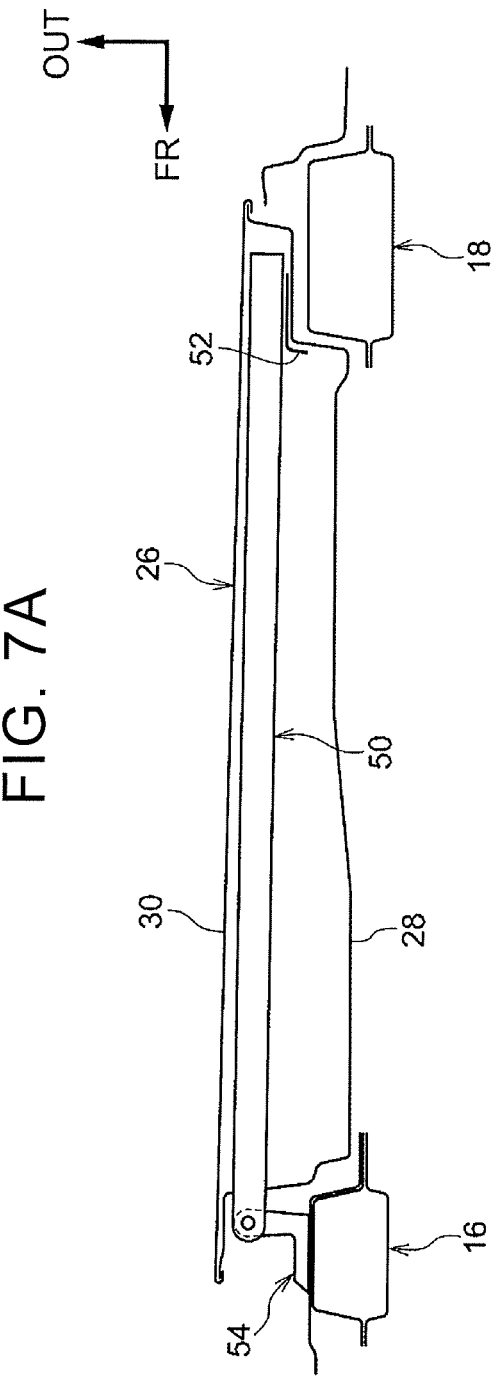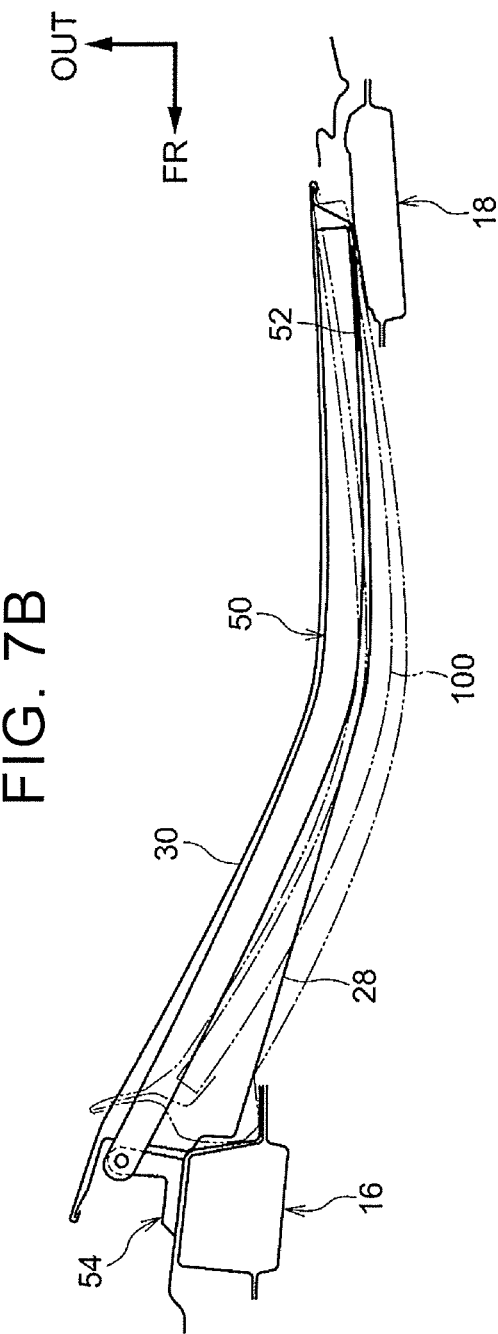

VEHICLE DOOR STRUCTURE

INCORPORATION BY REFERENCE

The disclosure of Japanese Patent Application No. 2017-246713 filed on Dec. 22, 2017 including the specification, drawings and abstract is incorporated herein by reference in its entirety.

BACKGROUND

1. Technical Field

The disclosure relates to a vehicle door structure.

2. Description of Related Art

A door impact beam that is a pipe member for reinforcement may be disposed inside a side door of an automobile in a vehicle front-rear direction in order to restrain the side door from deforming and entering a vehicle interior at the time of side collision. Specifically, the door impact beam is mounted on a door inner panel through mounting members adjacent to both end portions of the side door in the vehicle front-rear direction (see Japanese Unexamined Patent Application Publication No. 2010-149841 (JP 2010-149841 A)). For example, in a case of a front side door, at the time of side collision, a side collision load is transmitted through the door impact beam from an end portion of the door inner panel on a vehicle front side to, for example, a front pillar or the like through a door hinge. Thus, the side door is restrained from entering the vehicle interior.

SUMMARY

In the case of the related art, strength of the mounting member is lower than that of the door impact beam. Therefore, at the time of side collision, the mounting member may be deformed before the door impact beam receives the side collision load.

Thus, there is a room for improvement in effective transmission of a side collision load from the door impact beam to a vehicle body side such as the front pillar.

The disclosure provides a vehicle door structure that enables effective transmission of a side collision load from a door impact beam to a vehicle body side.

An aspect of the disclosure provides a vehicle door structure, including: a door hinge member mounted on a vehicle body; a door inner panel that constitutes a side door of an automobile; a door outer panel that is mounted on an outer side of the door inner panel in a vehicle width direction, and constitutes the side door of the automobile; and a door impact beam that is disposed between the door inner panel and the door outer panel, a first end side of the door impact beam being mounted on the door inner panel through a mounting member, a second end side of the door impact beam being rotatably mounted on the door hinge member.

With the aspect, the door impact beam extending in a vehicle front-rear direction is disposed between the door inner panel and the door outer panel that structure the side door. The first end side of the door impact beam is mounted on the door inner panel through the mounting member, and the second end side of the door impact beam is mounted on the door hinge member mounted on a vehicle body side, so that the door impact beam is able to swing. Therefore, when a side collision load is input to the side door of the automobile at the time of side collision, the side collision load is efficiently transmitted to the vehicle body side from the door impact beam through the door hinge member, and the side door (the door impact beam) is restrained from entering a vehicle interior. Here, the term "vehicle body" means a part excluding the side door. For example, the "vehicle body" may be a skeleton member of a vehicle.

With the aspect, the side collision load is efficiently transmitted to the vehicle body side from the door impact beam.

In the above aspect, a hinge pin may be mounted on the door hinge member; and an inserted portion in which the hinge pin is inserted may be provided in the second end side of the door impact beam.

In the vehicle door structure configured as above, the hinge pin of the door hinge member is inserted in the inserted portion that is formed in the second end of the door impact beam. Thus, the door impact beam and the side door supported by the door impact beam are mounted on the door hinge member (the vehicle body) so that the door impact beam and the side door are able to swing.

With the configuration described above, it is possible to mount the door impact beam on the door hinge member with a simple configuration so that the door impact beam is able to swing.

In the above aspect, the second end side of the door impact beam may extend to a door hinge member side through a hole provided in the door inner panel.

With the vehicle door structure configured as above, the second end side of the door impact beam is inserted in the hole formed in the door inner panel. Therefore, only by providing the hole in the existing door inner panel and allowing the impact beam to be inserted in the hole, it is possible to extend the second end of the impact beam to the side of the door hinge member.

With the configuration, it is possible to extend the door impact beam to the door hinge member only by making a simple change in the existing door inner panel.

The vehicle door structure according to the above aspect may further include a retainer that is disposed in the door inner panel at a position of the hole, and supports the door impact beam.

With the vehicle door structure configured as above, the door impact beam is supported through the retainer that is mounted on the hole of the door inner panel. In other words, the first end side of the door impact beam supports the side door through the mounting member, and the second end side of the door impact beam supports the side door through the retainer. Thus, the door hinge member is able to support the side door through the door impact beam in a favorable manner.

With the configuration, the side door is supported by the door hinge member through the door impact beam in a favorable manner.

In the above aspect, the door impact beam may have a pipe shape.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6A is a sectional view of a vehicle door structure according to a comparative example in a state before side collision;

FIG. 6B is a sectional view of the vehicle door structure according to the comparative example in a deformed state due to the side collision;

FIG. 7A is a sectional view of the vehicle door structure according to the first embodiment in a state before side collision;

FIG. 7B is a sectional view of the vehicle door structure according to the first embodiment in a deformed state due to the side collision.

DETAILED DESCRIPTION OF EMBODIMENTS

First Embodiment

A vehicle door structure according to a first embodiment of the disclosure is described with reference to FIG. 1 to FIG. 7B. In the description below, a vehicle front side is shown by an arrow FR, a vehicle upper side is shown by an arrow UP, and an outer side in a vehicle-width direction is shown by an arrow OUT in each of the drawings.

Configuration

Vehicle Body

Figure 1:
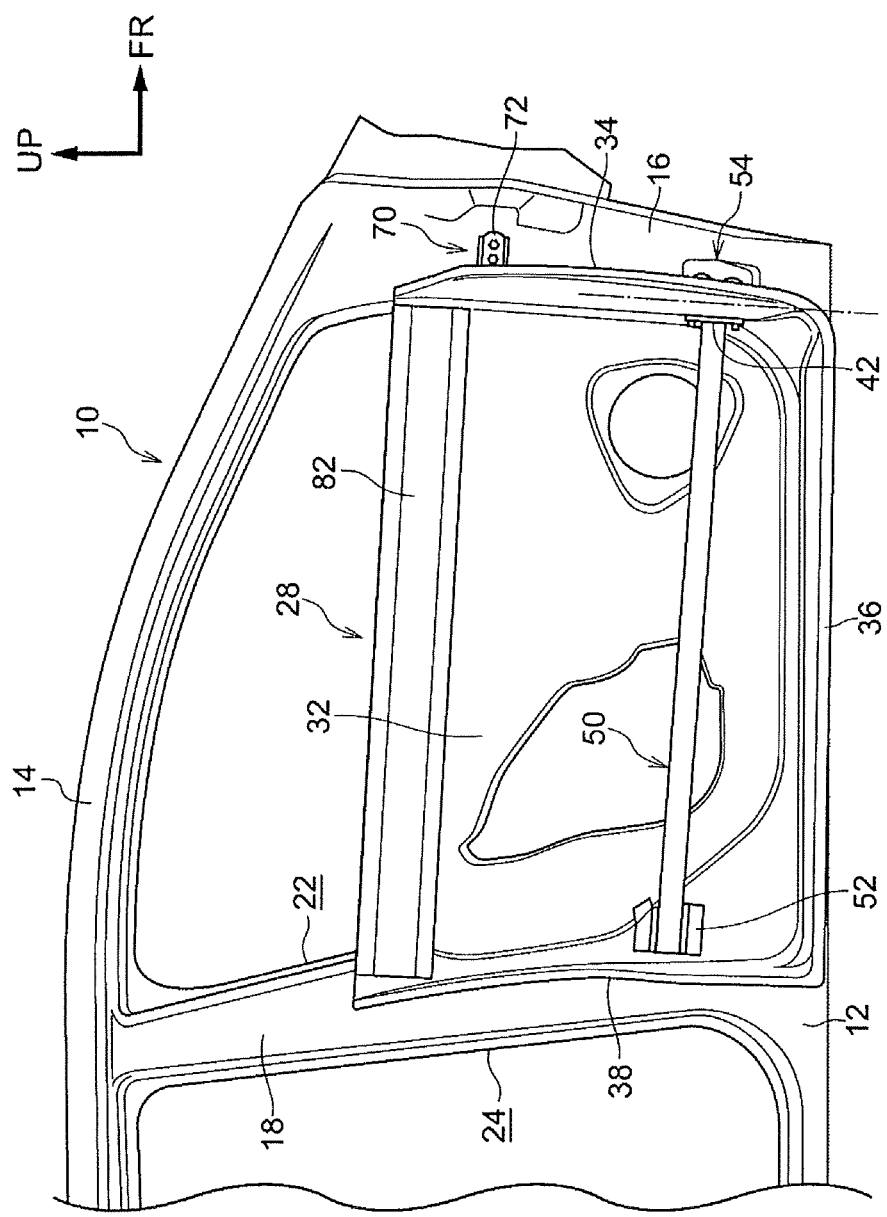
FIG. 1 is a partially-omitted side view of a vehicle door structure according to a first embodiment, seen from an outer side of a vehicle.

As shown in FIG. 1, a vehicle body 10 included in a vehicle is provided with a rocker 12, and a roof side rail 14 that extend in a vehicle front-rear direction, and a front pillar 16, a center pillar 18, and a rear pillar 20 (see FIG. 2) that extend in a vehicle upper-lower direction. The rocker 12, the roof side rail 14, the front pillar 16, the center pillar 18, and the rear pillar 20 are provided on both side parts of the vehicle.

A lower end of the front pillar 16 is joined to a front portion of the rocker 12 in the vehicle front-rear direction, and an upper end of the front pillar 16 is joined to a front portion of the roof side rail 14 in the vehicle front-rear direction. A lower end of the center pillar 18 is joined to a central portion of the rocker 12 in the vehicle front-rear direction, and an upper end of the center pillar 18 is joined to a central portion of the roof side rail 14 in the vehicle front-rear direction. A lower end of the rear pillar 20 is joined to a rear portion of the rocker 12 in the vehicle front-rear direction, and an upper end of the rear pillar 20 is joined to a rear portion of the roof side rail 14 in the vehicle front-rear direction.

Also, the front pillar 16, the center pillar 18, the rocker 12, and the roof side rail 14 form a front side door opening 22 as a doorway for an occupant. Further, the center pillar 18, the rear pillar 20, the rocker 12, and the roof side rail 14 form a rear side door opening 24 as a doorway for an occupant.

The front side door 26 is able to open and close the front side door opening 22. Also, a rear side door (not shown) is able to open and close the rear side door opening 24.

Vehicle Door Structure

Next, a vehicle door structure applied to the front side door 26 is described.

Figure 2:
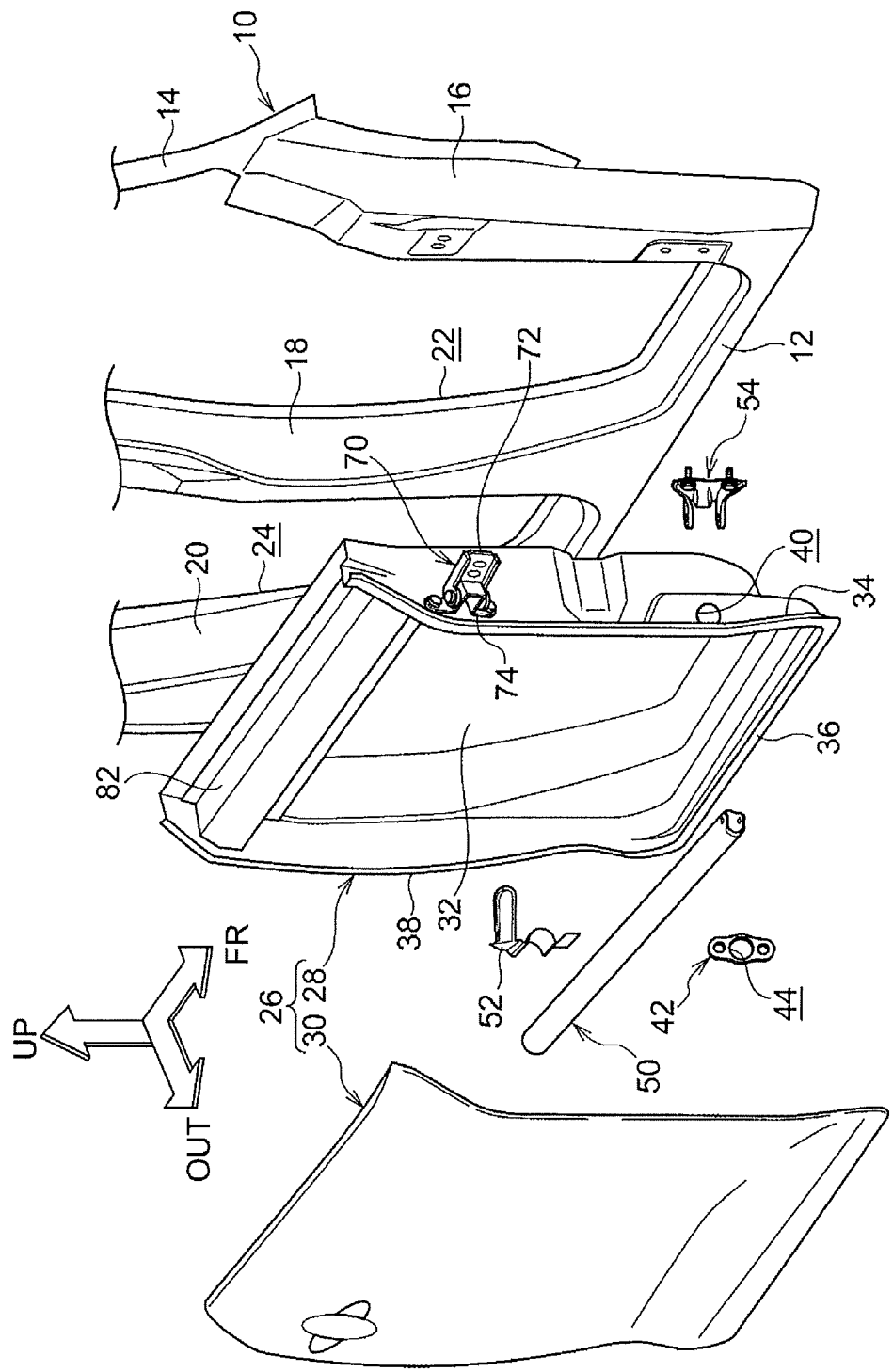
FIG. 2 is an exploded perspective view of the vehicle door structure according to the first embodiment.
Figure 3:
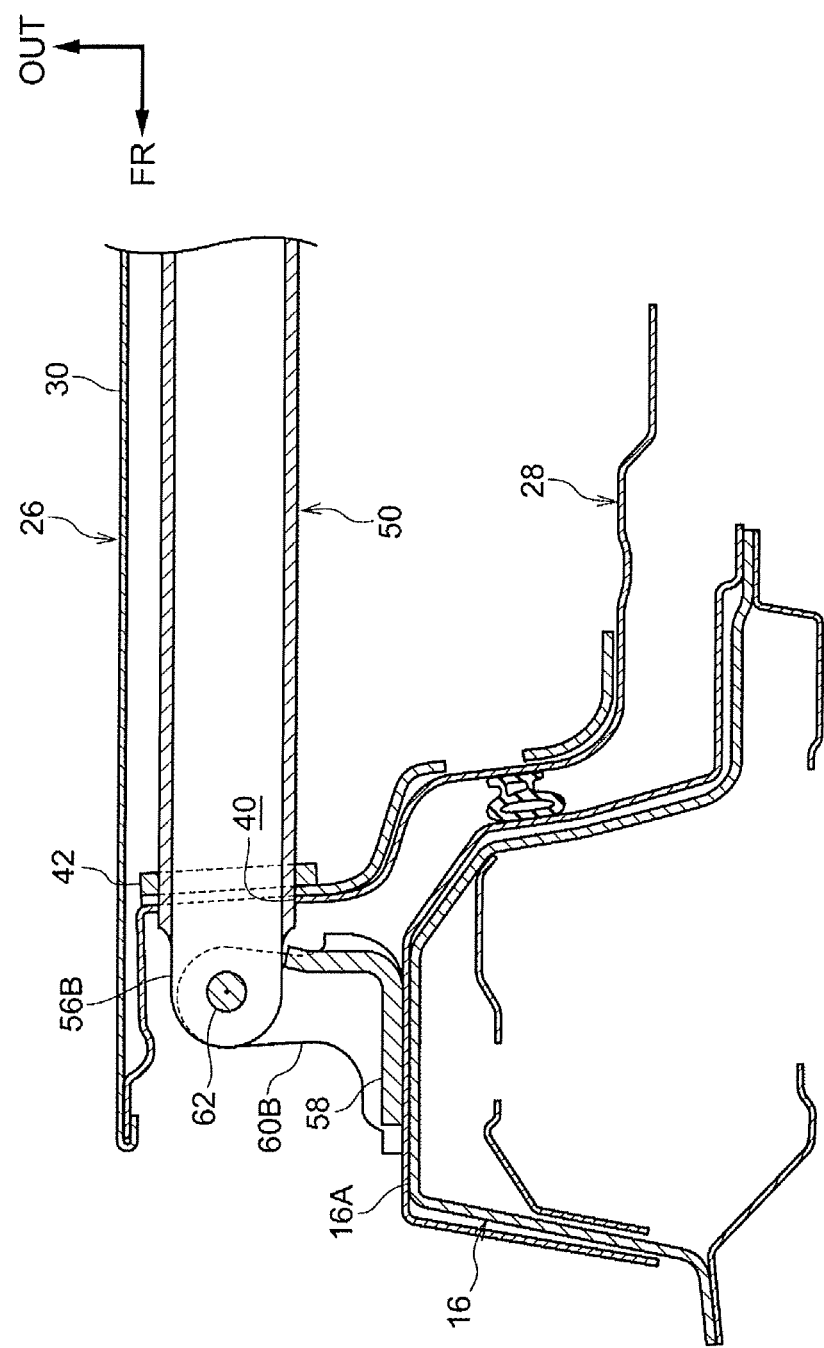
FIG. 3 is a horizontal sectional view of a main part of the vehicle door structure according to the first embodiment.

As shown in FIG. 2, the front side door 26 includes a door inner panel 28 and a door outer panel 30. The door inner panel 28 structures an inner side of the front side door 26 in the vehicle width direction, and the door outer panel 30 structures an outer side of the front side door 26 in the vehicle width direction.

As shown in FIG. 1 and FIG. 2, the door inner panel 28 includes a flat plate portion 32, a front flange portion 34, a lower flange portion 36, and a rear flange portion 38. The flat plate portion 32 has a substantially rectangular shape in a side view of the vehicle. The front flange portion 34 extends from an end portion of the flat plate portion 32 on the vehicle front side to the outer side in the vehicle width direction. The lower flange portion 36 extends from an end portion of the flat plate portion 32 on a vehicle lower side to the outer side in the vehicle width direction. The rear flange portion 38 extends from an end portion of the flat plate portion 32 on a vehicle rear side to the outer side in the vehicle width direction.

As shown in FIG. 2, a hole 40 for inserting a later-described door impact beam is formed in the front flange portion 34 on the vehicle lower side. Also, a retainer 42 is fastened to a vehicle rear side surface of the front flange portion 34 at a position where the hole 40 is formed (see FIG. 1, FIG. 5). As shown in FIG. 2, a hole 44 for inserting the door impact beam is formed in the retainer 42.

Figure 4:
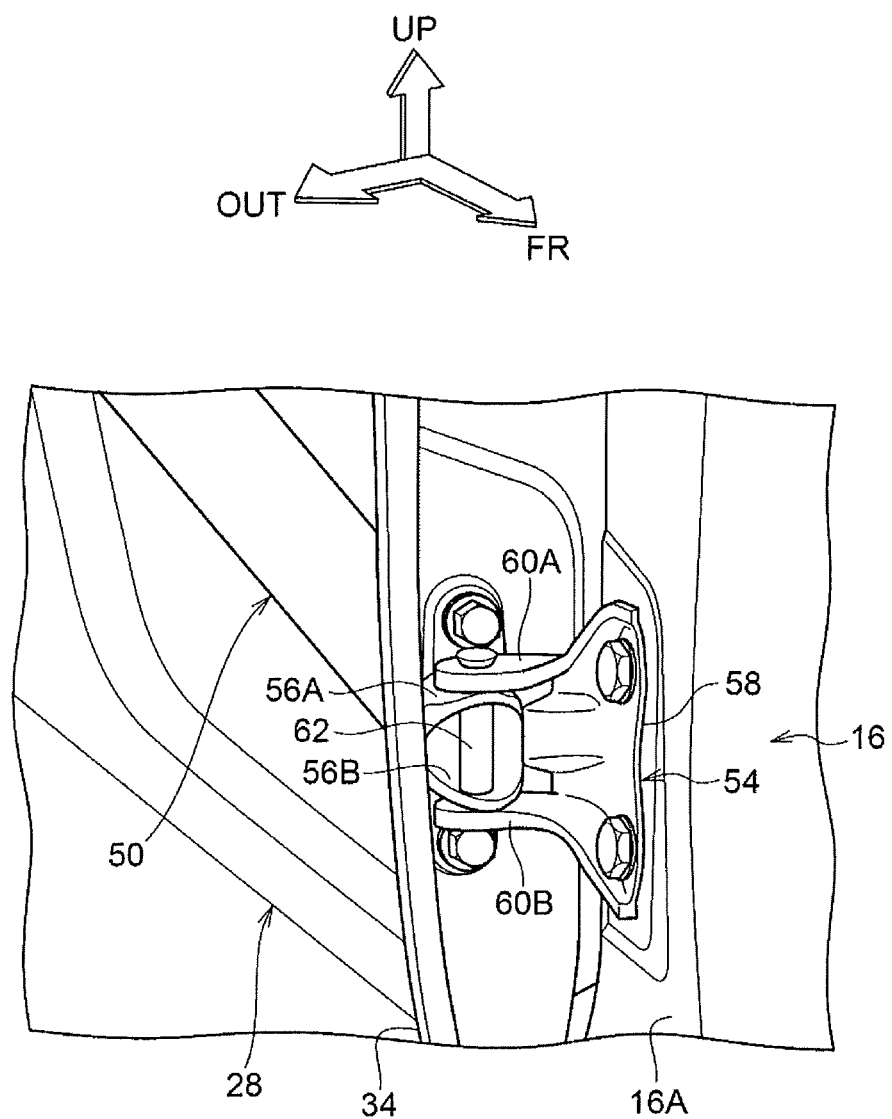
FIG. 4 is a perspective view of a mounting structure for an impact beam on a hinge member in the vehicle door structure according to the first embodiment.
Figure 5:
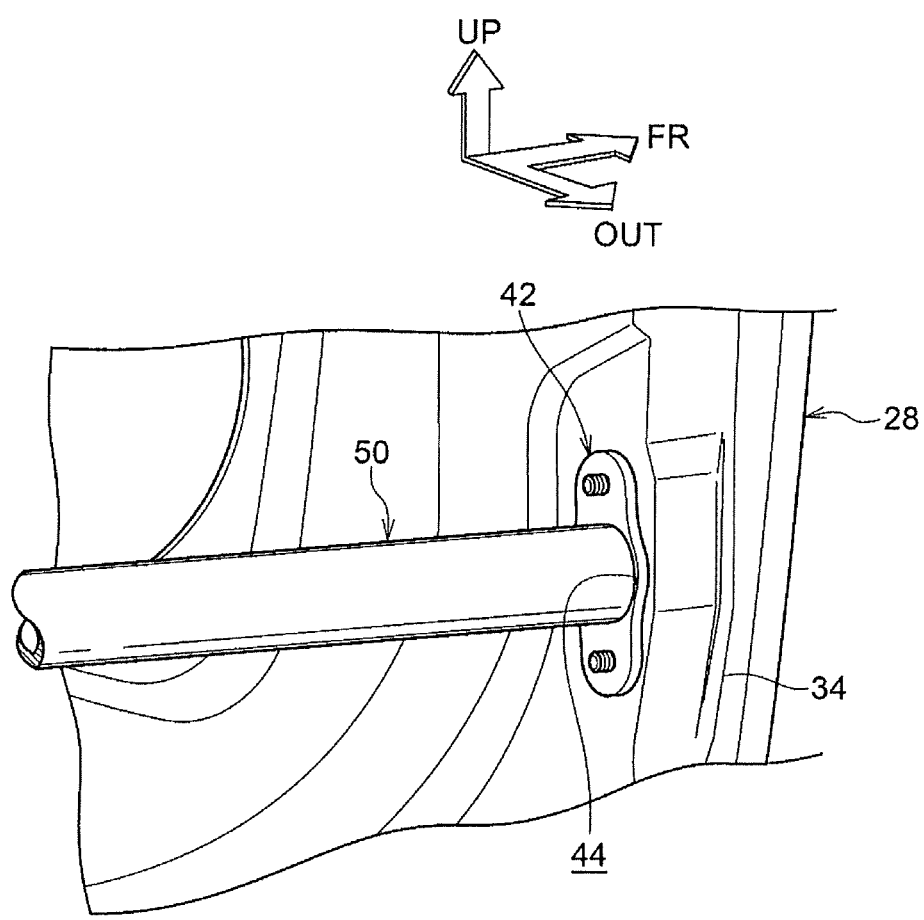
FIG. 5 is a perspective view of a door impact beam support structure in the vehicle door structure according to the first embodiment.

As shown in FIG. 1, the door impact beam 50 is a cylindrical pipe, and an end portion of the door impact beam 50 on the vehicle rear side is mounted on a vicinity of the end portion of the flat plate portion 32 of the door inner panel 28 on the vehicle rear side through a mounting member 52. As shown in FIG. 4, an end portion of the door impact beam 50 on the vehicle front side has tongues 56A, 56B that project to the vehicle front side from both end portions in the vehicle upper-lower direction. The end portion of the door impact beam 50 on the vehicle front side is inserted in the hole 44 of the retainer 42 and the hole 40 of the front flange portion 34, and thus disposed on the vehicle front side of the front flange portion 34. The retainer 42 is mounted on the front flange portion 34 of the door inner panel 28. Thus, the end portion of the door impact beam 50 on the vehicle front side is mounted on a lower door hinge 54 so as to be able to rotate.

As shown in FIG. 4, the lower door hinge (a vehicle body-side lower hinge) 54 includes a base portion 58, pivotally supporting portions 60A, 60B, and a hinge pin 62. The base portion 58 is fastened to an outer side surface 16A of the front pillar 16 in the vehicle width direction. The pivotally supporting portions 60A, 60B are formed so as to project from the vehicle upper side and the vehicle lower side of the base portion 58, respectively, to the outer side in the vehicle width direction. The hinge pin 62 is supported by the pivotally supporting portions 60A, 60B.

The hinge pin 62 is inserted in holes (not shown) of the tongues 56A, 56B that are formed in the end portion of the door impact beam 50 on the vehicle front side. At the same time, both end portions of the hinge pin 62 are engaged with the pivotally supporting portions 60A, 60B, respectively.

The tongues 56A, 56B correspond to inserted portions. Also, the door impact beam 50 is disposed so that a direction orthogonal to a hinge center line (an axis direction of the hinge pin 62) coincides with an axis direction of the door impact beam 50.

Further, an upper door hinge 70 is mounted on a vehicle front side surface of the front flange portion 34 of the door inner panel 28 on the vehicle upper side.

As shown in FIG. 2, the upper door hinge 70 includes a vehicle body-side upper hinge 72, and a door-side upper hinge 74. The vehicle body-side upper hinge 72 is mounted on the outer side surface 16A of the front pillar 16 in the vehicle width direction. The door-side upper hinge 74 is mounted on the vehicle front side surface of the front flange portion 34 of the door inner panel 28. A hinge pin 80 that is supported between pivotally support portions 78A, 78B of the vehicle body-side upper hinge 72 is inserted in tongue pieces 76A, 76B of the door-side upper hinge 74.

The upper door hinge 70 and the lower door hinge 54 enable the front side door 26 to rotate with respect to the vehicle body 10.

In an upper part of the front side door 26, a belt line reinforcement (hereinafter, referred to as a "belt line R/F") 82 having a closed section is disposed between the front flange portion 34 and the rear flange portion 38 of the door inner panel 28.

Effects

Next, effects of the vehicle door structure are described.

First of all, effects obtained when a vehicle has a side collision are described. In order to do so, a comparison is made between the door impact beam 50 and a door impact beam 100 (see FIG. 6A). The door impact beam 50 is an example (see FIG. 7A) having the same configuration as that of the embodiment. In the door impact beam 100, an end portion on the vehicle front side and an end portion on the vehicle rear side are mounted on a door inner panel 28 through mounting members 102, 52, respectively.

In the case of the door impact beam 100, at the time of side collision, a side collision load is input to the door impact beam 100 of a front side door 26 from the outer side in the vehicle width direction. Then, the mounting member 102 having lower strength than that of the door impact beam 100 is deformed (see FIG. 6B). It is thus not possible to efficiently transmit the side collision load to a vehicle body side through a door hinge (not shown). As a result, with the deformation of the mounting member 102, the door impact beam 100 is largely deformed (curved) to the inner side in the vehicle width direction, and the front side door 26 largely enters the vehicle interior side.

Meanwhile, as shown in FIG. 7A, in the case of the door impact beam 50, since the end portion of the door impact beam 50 on the vehicle front side is connected directly with the lower door hinge 54, a load is efficiently transmitted to the front pillar 16 (the vehicle body side) from the door impact beam 50 through the lower door hinge 54. Therefore, it is possible to restrain the door impact beam 50 from largely entering the vehicle interior (see FIG. 7B). This means that, as shown in FIG. 7B, in comparison with the door impact beam 100, deformation of the door impact beam 50 to the vehicle interior side (the inner side in the vehicle width direction) is restrained.

Moreover, in the vehicle door structure, the hole 40 is provided in the front flange portion 34 of the door inner panel 28 of the front side door 26, thus enabling the end portion of the door impact beam 50 on the vehicle front side to be connected directly with the lower door hinge 54. This means that, the structure is applicable only by forming the hole 40 in the existing door inner panel 28, slightly extending the door impact beam 50, and providing the tongues 56A, 56B in the front end portion of door impact beam 50.

Further, the end portion of the door impact beam 50 on the vehicle front side is directly mounted on the lower door hinge 54 (the vehicle body-side lower hinge) through the tongues 56A, 56B. Therefore, it is not necessary to provide a door-side lower hinge for the lower door hinge 54.

Furthermore, since the door impact beam 50 is fitted to the hole 44 of the retainer 42, it is possible to support the front side door 26 through the retainer 42. This means that the front side door 26 is supported by the vehicle body 10 in a favorable manner through the door impact beam 50 and the lower door hinge 54.

In the vehicle door structure, the door impact beam 50 is directly mounted on the lower door hinge 54 so that the door impact beam 50 is able to rotate. Therefore, at the time of side collision, a side collision load that is input to the door impact beam 50 is efficiently transmitted to the front pillar 16 through the lower door hinge 54. As a result, it is possible to restrain the front side door 26 from entering the vehicle interior.

The end portion of the door impact beam 50 is supported by the hinge pin 62 of the lower door hinge 54 (the vehicle body-side lower hinge) so that the door impact beam 50 is able to rotate. Thus, rotation performance of the front side door 26 is ensured. Also, with this configuration, it is not necessary to provide a door-side lower hinge for the lower door hinge 54.

Second Embodiment

A vehicle door structure according to a second embodiment of the disclosure is described with reference to FIG. 8. The same components as those of the first embodiment are denoted by the same reference numerals, and description of those components is omitted.

Figure 8:
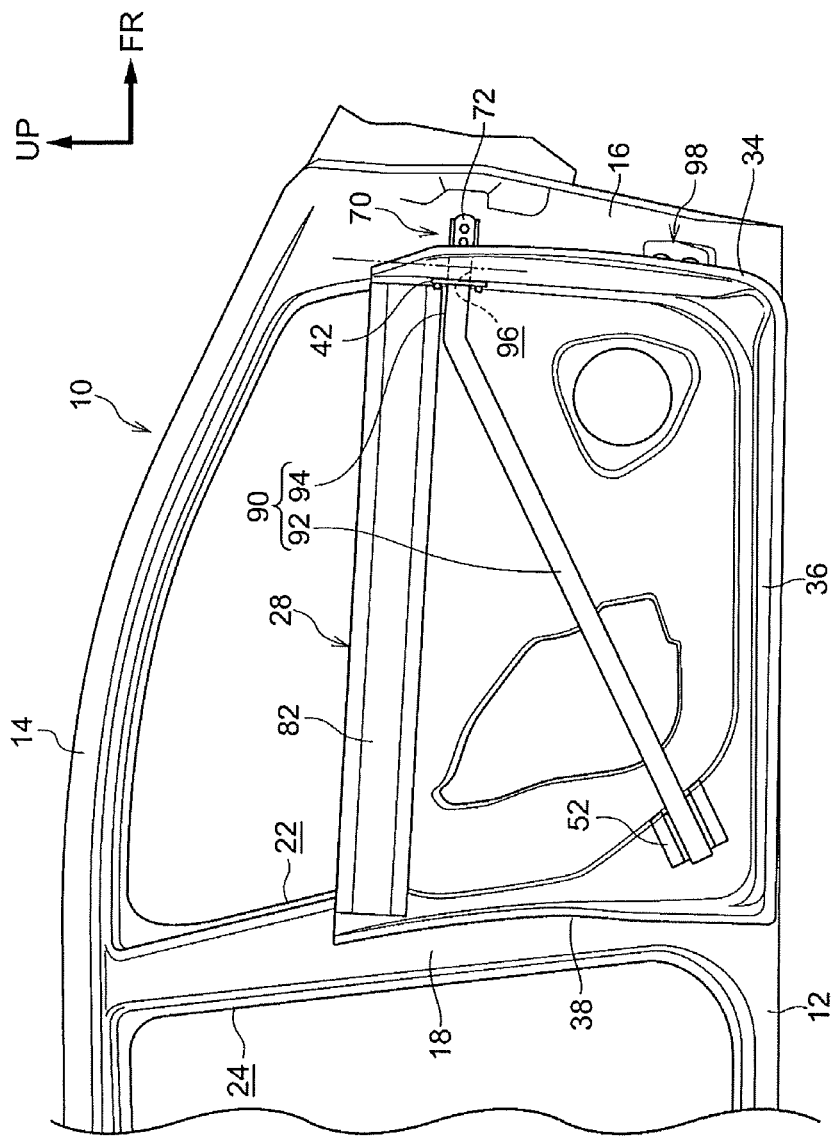
FIG. 8 is a partially-omitted side view of a vehicle door structure according to a second embodiment, seen from an outer side of a vehicle.

As shown in FIG. 8, a door impact beam 90 includes an inclined straight portion 92, and a parallel straight portion 94. The inclined straight portion 92 is disposed so as to be inclined to the vehicle upper side from the vehicle rear side of the door inner panel 28 towards the vehicle front side. The parallel straight portion 94 extends from an end portion of the inclined straight portion 92 on the vehicle front side towards the vehicle front side.

Further, a hole 96 is formed in the front flange portion 34 of the door inner panel 28 on the vehicle upper side, and a distal end of the parallel straight portion 94 is inserted in the hole 96. Tongues (not shown) are made in the distal end of the parallel straight portion 94, and a hinge pin is inserted into the tongues of the door impact beam 90. The hinge pin is supported by a pivotally supporting portion of a vehicle body-side upper hinge 72 of an upper door hinge 70. Thus, the door impact beam 90 is supported by the upper door hinge 70 so that the door impact beam 90 is able to rotate. This configuration is thus the same as that of the lower door hinge 54 according to the first embodiment.

Meanwhile, a lower door hinge 98 is supported by a vehicle body-side lower hinge and a door-side lower hinge (not shown) so that the lower door hinge 98 is able to rotate. Thus, this configuration is the same as that of the upper door hinge 70 according to the first embodiment.

With the vehicle door structure configured as above, the front side door 26 is also configured so as to open and close with respect to the vehicle body 10, and, at the time of side collision, a side collision load input to the door impact beam 90 is effectively transmitted to the front pillar 16 through the upper door hinge 70. The door impact beam 90 (the front side door 26) is thus restrained from entering the vehicle interior side.

Others

In the embodiment, description is given regarding an instance where the vehicle door structure is applied to the front side door 26. However, the vehicle door structure may be applied to a door at an arbitrary position, such as a rear side door, as long as the door is for an automobile.

What is claimed is:

1. A vehicle door structure, comprising:
   a door hinge member mounted on a vehicle body;
   a door inner panel that constitutes a side door of an automobile;
   a door outer panel that is mounted on an outer side of the door inner panel in a vehicle width direction, and constitutes the side door of the automobile; and
   a door impact beam that is disposed between the door inner panel and the door outer panel, a first end side of the door impact beam being mounted on the door inner panel through a mounting member, a second end side of the door impact beam being rotatably mounted on the door hinge member,
   wherein the second end side of the door impact beam extends to a door hinge member side through a hole provided in the door inner panel.

2. The vehicle door structure according to claim 1, wherein:
   a hinge pin is mounted on the door hinge member; and
   an inserted portion in which the hinge pin is inserted is provided in the second end side of the door impact beam.

3. The vehicle door structure according to claim 1, further comprising:
   a retainer that is disposed in the door inner panel at a position of the hole, and supports the door impact beam.

4. The vehicle door structure according to claim 1, wherein
   the door impact beam has a pipe shape.

* * * * *